United States Patent [19]

Brown et al.

[11] 4,267,446
[45] May 12, 1981

[54] DUAL SCINTILLATION DETECTOR FOR DETERMINING GRADE OF URANIUM ORE

[75] Inventors: Robert Brown, Arvada; Paul A. Proulx, Golden, both of Colo.

[73] Assignee: Geoco, Inc., Denver, Colo.

[21] Appl. No.: 26,721

[22] Filed: Apr. 3, 1979

[51] Int. Cl.³ .................. G01V 5/00; G01T 1/20; G01T 1/00
[52] U.S. Cl. .................. 250/255; 250/265; 250/367; 250/394
[58] Field of Search .......... 250/367, 486, 366, 266, 250/255, 265, 253, 394, 264

[56] References Cited

U.S. PATENT DOCUMENTS

| | | | |
|---|---|---|---|
| 2,920,204 | 1/1960 | Youmans | 250/265 |
| 3,032,658 | 5/1962 | Youmans | 250/265 |
| 3,041,455 | 6/1962 | Meyerhof | 250/264 |
| 3,270,202 | 8/1966 | Long et al. | 250/328 |
| 3,288,996 | 11/1966 | Monaghan | 250/267 |
| 3,363,457 | 1/1968 | Ruehle et al. | 250/253 |
| 3,544,793 | 12/1970 | Bless et al. | 250/253 |
| 3,566,118 | 2/1971 | Peters | 250/367 |
| 3,914,602 | 10/1975 | Goldstein | 250/253 |
| 4,158,773 | 6/1979 | Novak | 250/361 R |

FOREIGN PATENT DOCUMENTS

2823783  12/1978  Fed. Rep. of Germany ........... 250/367

*Primary Examiner*—Alfred E. Smith
*Assistant Examiner*—Carolyn E. Fields
*Attorney, Agent, or Firm*—Sheridan, Ross, Fields & McIntosh

[57] ABSTRACT

A dual scintillation radiation detector having two different scintillation detector materials arranged and shaped in order to detect and determine the quantity of the two different radiations such as beta and gamma present within an unknown sample. The detector can be used in apparatus for laboratory use, manual portable probe applications, or in elongated probes for simultaneously reading radiation present as the probe is lowered into an earth bore. The scintillation radiation detector material for the high energy radiation is positioned on the opposite side of the first detector material from the radiation source so that the high energy radiation must penetrate through the first material before entering the second. This provision allows discrimination and filtering of the low energy radiation from the second detector material. The first detector material is provided in the shape of a thin, flat plate or in the shape of a hollow cup with the second material mounted on one side of the plate or within the cup. Suitable photomultiplier sensing tubes are connected to a surface of the scintillation material to convert the light energy pulses caused by the radiation into electrical output pulses which are processed and digitally displayed. Suitable radiation shielding is provided in conjunction with the scintillation detector materials to filter and discriminate against unwanted low energy radiation. The detector is suitable for use in the beta-gamma method of analysis for determining uranium oxide ore grade within an unknown sample.

30 Claims, 13 Drawing Figures

DUAL SCINTILLATION DETECTOR FOR DETERMINING GRADE OF URANIUM ORE

TECHNICAL FIELD

This invention relates to a dual radiation scintillation detector which is provided for the determination of uranium ore grade. It is more specifically directed to an improved scintillation detector which can instantaneously determine the grade of uranium ore present at a particular location. This invention includes the use of a combination detector for measuring the presence of two differnet types of radiation necessary to make an accurate ore grade determination.

BACKGROUND ART

In the past, it has been necessary to obtain specimens or samples of various suspected materials which were believed to contain some percentage of uranium oxide ore and transport these specimens to an analysis site. It was then necessary to crush the sample into finely divided particles and pack these particles into a known volume sample container. The container, along with the unknown sample, was then subjected to an instrument which would read out the amount of radiation being emitted from the sample in order to determine the percentage of uranium ore present. Normally this analysis and readout of the sample would have to be performed in a laboratory usually located a considerable distance from the place where the sample was obtained. This arrangement is not only required with respect to mining of uranium at a remote mine site but in analyzing core samples which are taken from earth bores. The analysis of earth bores and geological strata has in the past been both a time-consuming and inaccurate method of analysis.

The primary inaccuracy occurs due to the fact that movement and time delay in making the actual analysis allows portions of the radioactive daughters of the original uranium element such as radon (gas) to be lost. Thus, it is necessary and desirable in order to improve this accuracy to perform the analysis in-situ and to obtain the results instantaneously to determine the exact percentage of uranium ore present.

This is especially true with respect to open strip mining of uranium ore where it is desirable and necessary to determine exactly where the highest percentage ores are located. Under present operations, ore material is stripped from the surface and transported by truck or conveyor to a location where the ore is graded and sorted so that the material containing an economical percentage of uranium ore will be retained for further processing. Those materials which do not have a sufficient quantity of uranium ore are dumped and eliminated from further processing. Where the mining operation is dealing with marginal ore grades, the most accurate method of determining ore percentage is mandantory. Thus, if an accurate instantaneous monitoring of ore grade is available, it will eliminate the necessity for stripping uneconomical material in the first place and for accurately determining the sorting of the once mined ore so that marginal ore can be economically processed.

The same type of situation occurs in earth bores during the geological investigation of uranium mineralization within the earth. Thus, in many cases, earth bores are used in geological investigations to determine the location of economical concentrations of uranium ore prior to establishing mining operations. As explained above, at present the core is taken from the bore holes and crushed in a laboratory, and subjected to individual sample analysis by means of a laboratory instrument.

This type of analysis, in the past, has been directed to alpha, beta, or gamma radiation detection and the use of various calculations or charts and tables to correlate the radiation readings of these various types of radiation to determine the quantity and type of materials that are present in the sample.

In order to be able to better understand the significance of the present invention, it is necessary to thoroughly understand the background concerning detection and determination of radio activity with respect to various isotopes of uranium.

As is well known, uranium 238, the most abundant naturally occurring isotope of uranium is radioactive. This is to say that the atomic nucleus of the uranium atom is unstable and has a finite probability of undergoing spontaneous radioactive decay to create the nucleus of another element. Thus, as can be seen by Table 1, uranium 238 decays to form thorium 234. Thorium 234 is also unstable and radioactive and further decays forming protactinium 234 which further decays to form radioactive uranium 234 and so on through the decay series until a stable nucleus, lead 206, is reached. The decay series for uranium 238, as illustrated in Table 1, can be divided into two essential groups; the uranium group which is comprised of the parent uranium 238 and its four daughters, and the radium group which consists of radium 226 and all subsequent daughters down to the formation of lead 206.

If an initially pure sample of uranium 238 is allowed to remain undisturbed in the ground for a long period of time, it will progressively decay and generate all of the nuclides shown in Table 1. Thus, a steady state or "equilibrium" concentration is reached at which the rate of formation of the radioactive nuclid is essentially the same as its rate of decay. This equilibrium concentration, at any given time, will be directly proportional to the original concentration of parent uranium.

Ideally, this equilibrium will be the status of natural deposits of uranium ore which are undisturbed. The analysis of uranium ore grade under such circumstances would be relatively simple and accurate. The disturbance of the uranium ore, however, causes a disequilibrium due to the loss of certain elements or daughters, causing an unblance between the uranium and radium groups. This can either be caused by leaching of some or all of the uranium group elements from the original deposit by means of ground water or by loss of the gaseous daughter radon 222 by subterranean migration or by disturbance from a mining or drilling process.

TABLE I

| GROUP | URANIUM DECAY SERIES ELEMENT | ENERGY EMITTED |
|---|---|---|
| Uranium Group | Uranium 238 | |
| | ↓ | α |
| | Thorium 234 | |
| | ↓ | βγ |
| | Protactinium 234 | |
| | ↓ | β |
| | Uranium 234 | |
| | ↓ | α |
| | Thorium 230 | |
| | ↓ | α |
| Radium Group | Radium 226 | |
| | ↓ | α |
| | Radon (gas) 222 | |

TABLE I-continued

| GROUP | URANIUM DECAY SERIES ELEMENT | ENERGY EMITTED |
|---|---|---|
| | ↓ Polonium 218 | α |
| | ↓ Lead 214 | α |
| | ↓ Bismuth 214 | β,γ |
| | ↓ Polonium 214 | β, γ |
| | ↓ Lead 210 | α |
| | ↓ Bismuth 210 | β |
| | ↓ Polonium 210 | β |
| | ↓ Lead 206 | α |

As can be seen from Table 1, each disintegration from one nuclide to the next lower in the series is accompanied by the emission of energy. This energy may take the form of an alpha particle (helium ion), a beta particle (electron) or gamma radiation (high energy photon). The radiometric analysis of these emissions can be performed by suitable detectors which are well known in the art. Since the rate of emission is proportional to the concentration of the emitting nuclides, the analysis can be made.

The counting of gamma radiation is the simplest and most commonly used technique for uranium ore analysis. In the past, scintillators or geiger-meuller counters have been used to detect the gamma radiation. However, this method is indirect since approximately 98% of the gamma activity of equilibrium uranium ore is produced by the radium group, notably the nuclides lead 214 and bismuth 214. What the gamma detectors acutally sense is the amount of lead 214 and bismuth 214 present in the ore sample. Under equilibrium conditions, the levels of these isotopes are directly proportional to uranium content, and gamma activity can be related directly to ore grade or percentage.

However, as is also well known, both lead 214 and bismuth 214 are short-lived daughters of radon 222. Hence ore disequilibrium caused either by uranium-radium group unbalance or by radon gas loss severely effects the gamma activity of the ore and interpretation of ore grade can be extremely inaccurate or misleading. If the disequilibrium is caused by the loss of radon 222 which has a half-life of only 3.8 days, the equilibrium conditions can be restored by means of the "closed can" gamma assay method which is well known. The disequilibrium resulting from uranium-radium unbalance is more serious however. The long-lived isotopes uranium 238, thorium 230, and radium 226 can return to equilibrium only after as much as $10^4$ to $10^6$ years of undisturbed decay. Under these circumstances, where disequilibrium has occurred from this unbalance, gamma only counting cannot be used to accurately determine ore grade.

With the present invention a beta-gamma method of accurately determining uranium ore grade is obtainable. As far as the beta radiation activity of uranium ore in equilibrium is concerned, 60% results from the radium group. The bulk of the remainder is generated by the decay of protactinium 234, the second daughter of uranium 238. Because of the short half-life (24 days) of its predecessor, thorium 234, and its own short half-life of 1.175 minutes, protactinium 234 is invariably in equilibrium with and hence proportional to the uranium content of natural ores. Thus, measurement of the beta activity of protactinium can provide a reliable means in combination with the gamma radiation reading for the accurate determination of uranium ore grade. The major problem concerned, however, is that the beta radiation activity of the uranium group must first be distinguished from that of the radium group.

Table 1 shows that there are six principle beta emitters in the uranium series. Suitable shielding or attenuation of a beta detector permits only the more energetic beta radiation of protactinium 234, lead 214, and bismuth 214 to be counted. Thus, under these circumstances, the count rate of the beta radiation is proportional to the combined concentrations of these three elements. It has already been shown that the bulk of gamma radiation activity of uranium ore is generated by the decay of lead 214 and bismuth 214 which in turn is comparable to the beta radiation from these elements. Suitable attenuation of gamma ray detection permits gamma rays from only these two nuclides to be monitored. Thus, the subtraction of the count rate of gamma radiation from the beta count rate essentially leaves the count rate of the beta emission caused by protactinium 234 which allows us to determine uranium ore grade directly. This is the basis of the beta-gamma method. As can be easily seen, the key to the use of this method of determining ore grade is by the use of proper attenuation of the beta and gamma radiation detectors. This is one of the important features of the Applicants' invention, and allows the direct determination of percent of uranium oxide ($U_3O_8$) present in the analysis at the location site.

Although this is a simplistic explanation of the analysis process used in the present invention, it is intended to provide a background and understanding of the novel features of the Applicants' invention.

PRIOR ART STATEMENT

The following described patents are the most pertinent of which the Applicants are aware dealing with the novel features of the present invention.

The patent to Kampfer, U.S. Pat. No. 4,053,767 is directed to a method and apparatus for stablizing signals in radioactive well logging tools. The tool includes a main scintillating crystal and photomultiplier tube for direct detection of radiation in the earth bore hole. In addition, a reference crystal and source is included for producing continuous reference signals.

The patent to Obrycki, U.S. Pat. No. 3,796,879, refers to a method for automatically analyzing samples of radioactive material. The unknown samples are compared with radioactivity level of a reference set of samples. Concurrent analysis is performed on multiple samples to reduce the sample processing time.

The Armistead patent, U.S. Pat. No. 2,739,242, shows the use of two scintillation detection materials arranged concurrently with one material within the other and a photomultiplier tube in contact with its respective detector material at each end. Armistead teaches the use of the two detector materials so that the luminescence caused by the penetration of cosmic rays will be simultaneously identified by both the outer and inner detector material while the outer material also detects the presence of the radiation which is desired to be recorded. Thus, the pulses caused by the presence of cosmic rays in the inner detector can cancel out the signal detected by the outer detector, thus leaving only the pulses caused by the radiation which is desired to be detected.

The patent to Peters, U.S. Pat. No. 3,566,118, also shows a concentric radiation scintillation detector for detecting a large amount of neutron radiation in the presence of a large flux of gamma rays. In this way, the radiation detector can be operated for simultaneously detecting neutrons and gamma rays.

The patent to Kretz, et al., U.S. Pat. No. 3,457,180, discloses a scintillator material comprising a scintillating substance in a resin matrix of a copolymer. This is a plastic scintillator material which can be made responsive to various forms of radiation depending upon the process for crystallization materials utilized.

The Dennis, et al. patent, U.S. Pat. No. 3,940,610, describes the use of a gamma detector for measuring natural gamma radiation of earth formations by the use of bore hole logging systems. The gamma radiation signals obtained are processed by means of various operational amplifiers to determine the actual amount of correct thorium-gamma radiation present. No teaching is made of the use of the beta-gamma method of radiation identification.

The Eberline, U.S. Pat. No. 3,139,527, and W. P. Saler, et al., U.S. Pat. No. 3,452,197, patents show portable electronic equipment for identification of low level radiation sources. Both of these patents disclose a scintillation detector coupled with a photomultiplier tube provided in a portable probe. Both of these devices include a single scintillation detector for detecting only one type of radiation.

The patent to Laurer, U.S. Pat. No. 4,037,105, shows a plurality of scintillator detectors which are intended for sensitivity to two different types of radiation. The scintillator detectors are arranged in a sandwiched parallel configuration with the material sensitive to different radiation alternating in layers. Radiation is sensed by one end of the scintillating materials with the opposite ends of the materials adapted to face the photomultiplier tube which records light emissions from all detector materials simultaneously. Electronic circuitry is provided for differentiating between the types of radiation.

The patent to Battist, U.S. Pat. No. 3,767,915, shows a radiation monitoring system which continuously detects and measures low levels of radiation. This device simultaneously records both beta and alpha radiation which is drawn through an air sampling mechanism.

SUMMARY OF INVENTION

The present invention is directed to a novel scintillation detector for radiation which can utilize the beta-gamma method. Through the results of this method of testing, the concentration or grade of uranium $U_3O_8$ (uranium oxide) present at a given location can be readily and easily determined. This reading is given as a final percentage of uranium present in the material.

One of the major contributions of the present invention is the capability of utilizing a plastic scintillation material which can provide discrimination between two different types of radiation and accurate determination of the amount of beta and gamma radiation which is present at the test location. A novel provision which is utilized in this invention, namely the control of the thickness of the beta scintillation crystal within a specified thickness range, provides an extremely accurate determination of the beta radiation present without the masking or dilution caused by the additional presence of gamma radiation.

The detector as provided in the present invention utilizes the novel characteristics of the plastic scintillation material whereby through proper shielding the gamma radiation must pass through the beta crystal to reach the gamma detector. Thus, the gamma radiation passes directly through the beta detector material without the creation of light emissions and next, in turn, penetrates the gamma sensitive scintillation detector material. For accuracy, it is necessary that the passage of the gamma radiation through the beta material forms no interference or attenuation. Therefore, the thickness of the beta detector material must be limited to prevent a path through the material of over one-quarter inch to prevent photon generation by the gamma radiation. The beta detector material, in addition, absorbs the beta radiation and substantially prevents its penetration.

It has been found that if the gamma radiation travels a path through the beta detector material of more than one-quarter inch (0.250), errors will begin to occur in that photons will be generated by the gamma radiation which will make it impossible for the appropriate photomultiplier tube to differentiate between the light pulses generated by the passage of the beta or gamma radiation.

This characteristic of the beta material to luminesce with the extended passage of the gamma ray in addition to the beta radiation creates what is called signal to noise ratios which are unacceptable and which reduce the possible sensitivity of the ore grade readings.

With the present device as provided in this invention, sensitivity of 0.005% of the percentage of uranium oxide in a given sample can be determined. This is within a sensitivity tolerance of plus or minus 0.001%. Thus, the present invention provides an extremely novel approach to the problem of accurately determining uranium ore grade in-situ.

In the present application, three embodiments are described which include a field contact test instrument, a downhole probe for continuous, instantaneous analysis within an earth bore, and a "T" probe which is a portable testing device which can be easily and quickly utilized in the field to penetrate and test the earth's surface. In all of these embodiments, appropriate shielding is provided on the outer surface of the beta scintillation detector material to eliminate and filter low level beta radiation. Thus, the radiation counts which are detected within the beta detector material are generated by the high energy beta radiation principally from protactinium 234, lead 214, and bismuth 214. As explained above, protactinium 234 is always in equilibrium. Thus, the selective attenuation of the low energy beta radiations can provide the reliable direct percentage readings which are so desirable in field operations.

The present embodiments as described for the downhole and "T" probe arrangements utilize low diameter to length ratios in order to permit the detector to be adapted for the desired use. In order to obtain the desired results, the beta crystal structure is formed in the shape of a hollow cup wherein the walls are no greater than one-quarter inch thick. In fact, the thickness of the beta detector material is desirably maintained between 0.030 to 0.250 inches. It has been found that accurate measurements of beta radiation can be obtained with a beta scintillation detector material held within this range while false readings from gamma radiation can be minimized. The gamma radiation material is formed in the shape of a solid cylinder which fits the internal cavity of the beta material. Respective photomultiplier tubes are optically coupled to the respective ends of the beta and gamma detector materials. Radiation shielding is provided between the detector materials and the outside of the detector to provide the desired attenuation. In addition, coatings are provided on the surfaces of the material and between the detector materials to prevent the transfer of photon energy from one detector material to the other which could cause cross-feeding and error in the resulting signals. Suitable shock absorbing materials are also provided to insulate the detector materials one from the other and from the housing structure to prevent damage during use and handling. A conduit passageway can be provided on the outside surface of the detector longitudinally along the probe to allow passage of the high voltage wires to the outer photomultiplier tube and the transmission of the output signals from this photomultiplier tube to the display readout device.

In the "T" probe embodiment, since it is necessary that the radiation exposure window at which the actual sensing occurs be as close to the tip end of the probe as possible, the photomultiplier tube is held to an extreme minimum length and in some cases can be recessed within the beta scintillation detection material along with the gamma material to provide a desirable compact tip end for the probe. This arrangement reduces the required depth to which the probe must be inserted in the soil or sample at the test location.

The hand-held on-site radiation detector embodiment, according to the present invention, utilizes a relatively flat beta detector disc which is tapered from a generally flat upper center surface to a thin outer edge. Not only is the photomultiplier tube for the beta count optically attached to the back of the beta material, but also the gamma scintillation detector material and the comparable gamma photomultiplier are positioned in contact with the center portion of the beta material. Suitable shielding surrounding the detector materials is provided to prevent background or extraneous noise from external sources such as cosmic rays.

This same hand-held on-site detector can be utilized in the laboratory or in a laboratory setting by the attachment of a bottom cylindrical base section fabricated from lead over which the detector can be positioned. Usually the bottom sample section is the same diameter as the on-site detector. The bottom sample section has a radial slot provided whereby a sample can be inserted into the lower shielded section adjacent to the bottom of the detector so that direct read-out can be provided of an unknown sample. A coupling clamp can be provided for joining the base section with the upper detector in order to provide a stable device for use in a laboratory. With the event counter read-out provided within the body of the on-site detector, an extremely compact and portable unit is provided.

Throughout this specification reference is made to the use of a beta scintillation detector material such as NE 102 which can be purchased from Nuclear Enterprises, Inc. of San Carlos, Calif. It is to be understood that any type of plastic beta scintillating material which has the same characteristics can be utilized. It has been found as mentioned above, that the thickness characteristics of the material are important in providing the desired discrimination and sensitivity which is necessary for an instrument of this type. The gamma scintillation detection material is not as critical and any one of the suitable materials which are known in the art can be utilized, such as sodium iodide. With the proper coating and crystallization of materials, suitable radiation sensitivity and luminescence is provided by these detectors.

In light of the deficiencies in the prior art as stated earlier, an object of the present invention is to provide a radiation scintillation detector which can directly determine the percentage or grade of uranium oxide ore which is present at a test location.

Another objection of the present invention is to provide a radiation detector which is portable and easily handled which can be readily transported and used at the desired site.

A further object of the present invention is to provide a radiation scintillation detector which is inexpensive to manufacture and yet rugged enough to take the abuse of field handling and use.

A still further object of the present invention is to provide a compact, elongated radiation detector which can be lowered into an earth bore hole and provide instantaneous and continuous readings of the grade of uranium ore present at specific elevation levels within the bore hole.

A still further object of the present invention is to provide an instrument which gives extremely accurate and direct visual read-out of uranium ore grade percentages and is still easily convertible to a laboratory operation, if desired.

Another object of the present invention is to provide a radiation detector probe for the beta-gamma method of uranium ore testing which utilizes standard electronics to read out and determine the ore percentages on a direct and simultaneous basis.

Other objects and features of this invention will appear in the following description and appended claims, reference being made to the accompanying drawings forming a part of this specification, wherein like reference characters designate corresponding parts in the several views.

BRIEF DESCRIPTION OF DRAWINGS

FIG. 1 is a perspective view of a scintillation radiation detector according to the present invention;

FIG. 2 is a side elevational section view of the detector shown in FIG. 1;

FIG. 3 is a diagramatic view of the beta and gamma detector materials along with their associated photomultiplier sensors;

FIG. 4 is a perspective view of the scintillation radiation detector according to the present invention in a probe embodiment for earth bore survey;

FIG. 5 is a sectional view showing the side elevation of the probe embodiment and the arrangement of the detector components within the housing;

FIG. 6 is an enlarged partial sectional view taken along the lines 6—6 of FIG. 5 showing the arrangement of the beta and gamma detector materials;

FIG. 7 is a cross-sectional view taken along the lines 7—7 of FIG. 6;

DETAILED DESCRIPTION

Turning now more specifically to the drawings, FIG. 1 shows the scintillation radiation detector system 10 which includes the detector assembly apparatus 12 and electronic read-out assembly 14 resting on a conventional support such as a table or bench 16.

A suitable power source (not shown) is provided. This power source can be either conventional 110/220 volt AC or a battery power source and power supply providing a sufficiently high voltage to operate the various electronic components and sensors. In the present embodiment, the electronic apparatus 14 includes control switches 18 and digital read-out devices 20. Usually two visual displays are provided so that simultaneous read out of the output of both beta and gamma or other radiation which is desired to record can be displayed. Also, as will be explained later, an internal funtion can be controlled by suitable switching devices which will automatically substract the gamma readings from the beta readings to provide a direct percentage read-out of the uranium ore which is being analyzed.

The scintillation radiation detector apparatus 12 includes a detector section 22 which contains the radiation scintillating materials along with their respective photomultiplier sensors and suitable shielding. This portion which forms entire detector can be mounted on a shielded base section 24 and held together by a circumferential clamp 26. Circumferential flanges around the outer surface of the detector portion 22 and base portion 24 are secured by the tension type clamp 26 to form a rigid radiation detector which can be used in a fixed laboratory type environment or in mobile applications wherein the entire system is transported by means of a vehicle into the field for on-site testing of samples.

A sample drawer 28 can be provided within the base section 24 and arranged to slidably fit within a slot 30 provided diametrically within the base. A radiation transparent sample container with the prepared sample placed in the container is inserted within the drawer 28 which is then slidably moved into closed position within the base 24. In this fashion, the sample is properly positioned within the approximate center of the detector adjacent to the scintillation detection materials.

As seen in FIG. 2, the scintillation detector 12 contains the detector section 22 and the base section 24. The base section 24 contains the outer shell 32 which is filled with lead 34 for shielding purposes. The base section 24 rests on a suitable support such as a table 16. A slot 30, as described above, is diametrically provided within the base section 24 and the drawer 28 is slidably inserted within the slot 30.

The upper or detector section 22 of the detector 12 includes the outer shell 36 and a top cover plate 38 attached to the upper portion of the shell 36 by means of suitable fasteners such as screws 40. Shielding such as lead 42 is provided in the lower portion of the detector section 22 at a sufficient depth to suitably shield radiation scintillation materials 44 and 46 and associated photomultiplier scintillation light detectors 48 and 50 respectively. Interconnecting electrical cable 51 with photomultiplier wires 53, 55 are provided to supply power to the photomultipliers and for transmitting the output of the photomultipliers to the electronic read-out section 14 of the detector system. Thus, in this embodiment, the power for the operation of the photomultiplier tubes is provided from the electronic read-out section 14. The output of the multipliers which is a series of electrical pulses, proportioned to the amount of light energy present within the scintillating detector materials, is provided to the electronic display portion so that the direct electronic digital read-out of the output signal can be provided for each scintillation material.

A more detailed presentation of the structure of the scintillation materials 44 and 46 is provided in FIG. 3. The positioning and relationship of the radioactive sample and the configuration and sizing of the scintillating detector materials is of importance in the present invention. One of the significant features is the use of two different types of scintillating radiation detector materials in order that two different types of radiation may be sensed simultaneously. In the present invention, beta and gamma radiation sensitive materials are used in order to be able to obtain readings of both the amount of beta radiation and gamma radiation present in the sample. In this way, it is possible to determine the percentage of uranium ore present in the unknown sample.

Although throughout this specification reference may be made to beta and gamma radiation and the analysis of uranium ore, it is to be understood, however, that the invention may be used to detect various types of radiation by selecting suitable scintillation materials which will perform this function.

The beta sensitive radiation material 44 in the present embodiment is provided as a relatively thin, flat plate as shown in FIG. 3. Essentially, this plate 44 has a circular configuration, but any outer configuration can be provided as desired. For the purposes of illustration, a round configuration is shown and described which will suitably fit the round configuration of the outer shell of the detector 12.

In this embodiment, the flat surface 54 is provided in order that the detection material can be placed substantially in contact with the surface of the earth or unknown sample which is being tested. In the arrangement shown in FIGS. 1 and 2, the slotted area is provided for insertion of a sample in a lower base portion which is provided in the laboratory configuration. The width w of the slot is sized so that the sides of the slot 30 generally coincide with the longitudinal axes of the photomultiplier tubes 48 and 50. The depth of the slot 30 is generally designed so that it is no deeper than twice the thickness of the beta scintillation material 44. The purpose in the sizing of the slot will be explained below.

The upper surface 52 of the beta scintillation material 44 is also a flat area and is generally parallel to the surface 54. The surface 52 is sized and shaped for mounting the gamma radiation scintillation material 46 and the photomultiplier tube 48. Suitable optical coupling materials such as a synthetic resin or any suitable material can be provided between the scintillation materials 44, 46 and the photomultiplier tube 48. The outside surfaces of the scintillation materials 44, 46 can be polished and coated with an opaque material to reflect and retain the luminescence within the material and prevent loss. The gamma radiation scintillation material 46 and the photomultiplier tube 48 are positioned with the longitudinal axes of these two elements positioned generally equally spaced with respect to the center of the beta detecting material 44. Thus, as shown in FIG. 3, the distance X2 between the axis of the photomultiplier tube 48 and the center of the material 44 is equal to the distance X1 between the center of the material 44 and the longitudinal axis of the gamma detection material 46. Although it is preferably that the dimension X1 and X2 be equal, it is not mandatory. At the same time, the dimensions X1, X2 constitute the overall width of the sample slot 30 when provided in the lower base portion 24.

The beta scintillation material 44 provides a discriminating effect for gamma radiation which is sensed by the material 46. Thus, it has been found that it is preferable to hold the thickness t of the beta material 44 within the range of 0.030 inches to 0.250 inches. The lower limit is desirable from a structural standpoint to provide the minimum necessary strength to prevent the scintillation material 44 from fracturing during use. Due to the characteristics of this material with respect to high energy radiation such as gamma, it has been found that if the projected path of the radiation through the material is substantially in excess of 0.250 inches, scintillation begins to occur. Thus, gamma radiation traveling through the beta scintillation material 44 will cause luminescence which creates a high background or noise signal which greatly effects the accuracy of the read-out of the beta radiation.

It has been found desirable to limit the thickness t of the beta scintillation material 44 to 0.250 inches to obtain the desired accuracy. The thickness of the gamma scintillation detection material 46 is not critical, but must be optically coupled to the upper surface 52 of the scintillation material 44. The gamma radiation, after passing through the first material, then causes scintillation or the generation of light within the second material 46 which has been sensitized to this type of radiation.

When the detector 12 is used directly in the field, the base portion of the laboratory adapter 24 is omitted and the surface 54 of the first scintillation material 44 which is flush with the bottom surface of the detector 22 is placed directly on the earth's surface or in contact with the unknown sample. In this way, the second radiation passes substantially normal to the surface 54 directly through the thickness t of the scintillation material 44 and into the second scintillation material 46. Thus, a minimum amount of noise or inaccuracy is created within the beta material. The outer edges 56 of the beta material 44 can be curved or beveled as shown in FIG. 3 to a minimum thickness to restrict the overall passage of the high energy radiation to an approximate dimension of 0.250 inches. Thus, the upper surface 52 of the beta scintillation detector material 44 substantially follows a radius of curvature r as shown in FIG. 2 to substantially hold the projected travel of the high energy radiation somewhere close to the upper limit. In most devices, the radius r should be no greater than two times the outside dimension of the beta material 44. It is desirable to hold the thickness t of the material 44 to a dimension less than the 0.250 dimension in order to hold the angular travel of the gamma radiation within the dimensional range. In this way, substantially increased accuracy can be provided in a radiation detector of this type which will greatly improve the accuracy of the obtainable readings.

FIG. 4 shows another embodiment of the present invention in which the radiation detector is intended for use within a probe 60 which can be lowered by means of a cable 62 into an earth bore hole 64 drilled into the soil. In most cases this hole will be used in exploration to provide a profile of any radioactive materials present at the various depths below the earth's surface. In order to accomplish this survey profile, the radiation detection probe 60 is lowered into the hole at a uniform rate while the outputs from the photomultiplier tubes, as will be explained later, are simultaneously read out by means of a continuous recorder, such as a strip chart recorder. Thus, as the probe is lowered into the hole at a continuous rate, the speed of the strip chart recorder will be correlated so that the desired radioactivity readings can be plotted simultaneously with the elevation of the probe within the hole. The difference between the output readings of the two different radiations can also be plotted simultaneously to provide an indication of uranium ore grade at the various levels within the hole.

The radiation detection probe 60 has an attachment device such as eye bolt 66 secured centrally to the upper end 68 of the probe 60. This end 68 is usually flat and also accommodates a hermetically sealed plug 70 through which the electrical input and output cables 72 emerge from the probe. The cables 72 extend to the surface of the bore hole and are connected to the display recorders which are connected at the surface to an electrical power supply for operating the device.

The opposite end 73 of the radiation probe detector usually has a rounded cover 74 which allows the probe to pass easily down through the earth bore without becoming jammed or wedged into the side. It is also possible, if desired, to use a rounded configuration on the opposite end 68 of the detector 60 to prevent jamming and facilitate removal of the probe from the bore hole 64.

The probe-type radiation detector 60 has an outer body shell 76 extending generally the full length of the probe. This shell is usually made from a non-corrosive material such as stainless sleel or aluminum. A test section or window 78 is removed in an intermediate portion of the body shell 76 to correspond with the internal location of the radiation scintillation detection materials provided within. A longitudinal conduit 80 can be provided in a raised section along the outside of the body 76 or a section of the body shell material can be left intact to house and protect the internal electric cable 82 provided for the lower or tip end photomultiplier tube.

FIG. 5 shows the internal components within the detector probe 60 which includes the radiation detector 90 located substantially in the intermediate portion of the probe with the respective photomultiplier tubes 92 and 94 positioned on each end of the scintillation detection materials. The scintillation detection materials are positioned behind the cut-away or window area 78 provided in the outer shell 76 of the detector. A junction device 98 adjacent to the photomultiplier tube 94 provides the distribution of high voltage electrical power provided through cable 72 to the photomultiplier tube 94 and 92. Suitable supporting structure 96 is provided to support the internal components of the probe.

If desired, the rounded nose section 74 can be made removable with the upper portion of the junction device 98 positioned firmly against an internal shoulder provided within the shell 76. The support structure 96 can be in the form of a spring or biasing device to hold the internal components rigidly against shifting within the body shell. Also, suitable shock absorbing material can be provided internally on each end and between the internal components to prevent damage to the detector materials or photomultiplier tubes during handling and usage.

An enlarged detailed view of the important operating components of the radiation detector portion of the probe 60 is shown in FIGS. 6 and 7. Here the detector portion 90 is shown to include the first or beta radiation scintillation detection material 100 which is arranged in the form of a hollow cylinder which is closed at one end 102. The closed end 102 and side walls 104 form a cup-like configuration. The beta radiation photomultiplier tube 92 is optically coupled to the beta detection material 100 by means of an optical coupling film 106. This coupling film can be a synthetic resin or any suitable material. This coupling film allows the light formed by the scintillations within the material 100 to be efficiently transmitted into the sensor portion of the photomultiplier tube 92. Thus, the light passes easily across this junction. The outer surface 103 of the scintillation material 100 can be coated with an opaque material to prevent loss of the light energy to the outside so that it is retained within the material to be detected by the photomultiplier tube 92. In addition, a sheet or layer of stainless steel usually in the range of 0.001 inches is provided around the outside surface as a low energy radiation filter. Thus, where the beta-gamma method of determining uranium ore grade is utilized, low energy beta radiation from the uranium group is substantially filtered and prevented from penetrating into the beta scintillation detection material 100.

As previously mentioned, shock absorbing resilient pads 108, 110 can be provided between the respective photomultiplier tubes and the outer body shell 76 to prevent damage during handling. Mounted within the cavity 112 provided within the cup-like beta scintillation material 100 is a hollow lead shield 114 which is sized to fit snuggly within the cavity 112. The shield 114 is also cup-shaped with an internal cavity 116 in which is mounted the second or gamma scintillation radiation detection material 118. Resilient shock absorbing material 120 is provided in the lower end of the cavity 116 to support the scintillation material 118. A thin, stainless steel sheath 122 having a thickness of approximately 0.001 inches is provided to filter out low energy beta radiation.

When detecting beta and gamma radiation, the first scintillation detection material is usually NE 102 plastic beta detector material. The gamma detector can be any of the well-known materials such as sodium iodide or any of the other materials which are capable of scintillating upon the presence of high energy gamma radiation.

The upper end 124 of the gamma scintillation material 118 is optically coupled to its respective photomultiplier tube 94 by the film or coating 126. The upper end of the beta scintillation material 100 covered by a stainless steel ring 128 which seals and prevents the light energy within the material from being transmitted to the photomultiplier tube 94. Thus, only the light energy within the gamma detector material 118 is allowed to be transmitted to the gamma photomultiplier tube 94. As can be seen in FIG. 6, the low energy gamma radiation shield 122 extends only part way along the outer surface of the material 118 and permits a small portion of the low energy gamma radiation to penetrate the outer end of the scintillation material 118 to allow detection of a desired portion of the low energy gamma radiation present.

As explained oreviously, it is of importance in the present invention to provide a configuration in which the first scintillation detector material absorbs the lower levels of radiation, such as beta, while allowing the higher levels of radiation, such as gamma, to pass easily therethrough. In this way, a filtering or discrimination effect is provided to properly differentiate the two radiations so as to obtain accurate and sensitive output readings from the photomultiplier sensor tubes. Thus, the thickness of the side walls 104 of the first scintillation material 100 is maintained within the range of 0.030 to 0.250 inches throughout. This thickness is also maintained in the closed end 102 and is sufficient to transmit all available light energy into the photomultiplier tube 92. In this way, radiation passing inwardly through the window 78 of the detector probe 60 passes transversely through a maximum dimension of 0.250 inch of the first scintillation material 100. As explained, as the thickness of this material increases in excess of this dimension, it causes extraneous scintillation light energy to be generated within the material which causes inaccuracies and so called background noise in the first radiation or beta read-out. Suitable internal shielding 114 such as lead and the low energy radiation filter 122 discriminates and filters out all except the high energy gamma radiation which is indicative of the radium radioactive group. Thus, as can be seen, a highly efficient and sensitive radiation probe which is applicable to the beta-gamma radiation type of uranium ore analysis can be provided in the present invention.

The height of the exposure window 78 within the detector probe 60 can be adjusted in order to provide the desired sensitivity. In other words, if the height of the window 78 is 3 inches, a radiation scan of the materials within the bore hole having a vertical dimension of 3 inches would be recorded simultaneously. This height can be adjusted to any dimension which is determined by the sensitivity that is desired. The diameter of the overall detector probe 60 can also be varied depending upon the size of the bore hole in which the probe is to be used. It has been found that probes varying in diameter from 2 to 5 inches are satisfactory. In addition, it has also been found that it is not necessary to size the probe to closely fit the internal diameter of the bore hole. A clearance of as much as 1 or 2 inches between the sides of the probe and the bore hole still provides satisfactory sensitivity. The overall length of the probe can vary from as little as 10 inches to as much as 20 or 25 inches depending upon the size of the cylindrical radiation detection materials required and the available photomultiplier tubes. It has been discovered that a length to diameter ratio in the range of 3:1 to 5:1 have been found satisfactory for the intended bore hole survey use.

FIGS. 8–13 show another embodiment of the invention which provides a portable, "T" type radiation probe 138 which can provide instantaneous readings in the field. In this embodiment, a body canister 140 has a centrally mounted probe 142. Switches 144 and visual display devices 146 are suitably mounted in the upper plate 148 of the body 140. Support handles 150 are threadedly mounted on each side of the body 140. Electrical cable 152 extends outwardly through one of the handles 150 and interconnects the body 140 with a single source of battery power 154. A body harness 156 can be provided to allow the user to conveniently wear and carry the battery supply 154. As an alternative, it is possible to locate the single source of battery power within the housing, if desired. The power source 154 can be of any convenient type which provides the necessary voltages for operation of the radiation sensors and display. Usually a battery supply of 12-volt or 24-volt DC is satisfactory for operation of this equipment. As will be explained later, high voltage D.C. can be provided internally within the body 140 to provide all of the necessary voltages for the photomultiplier sensor tubes and display devices. The lower portion of the thin probe 142 includes a cut-away portion or sensing window 158. A pointed end cap 160 can be provided on the tip of the probe 142 to facilitate manually pushing the probe into the ground to execute the sample test. A longitudinal conduit 162 can also be provided on the outer surface of the probe 142 to protect and shield the electrical wiring to the outer photomultiplier tube.

Figures 8, 9, 10, 11, 12, 13:
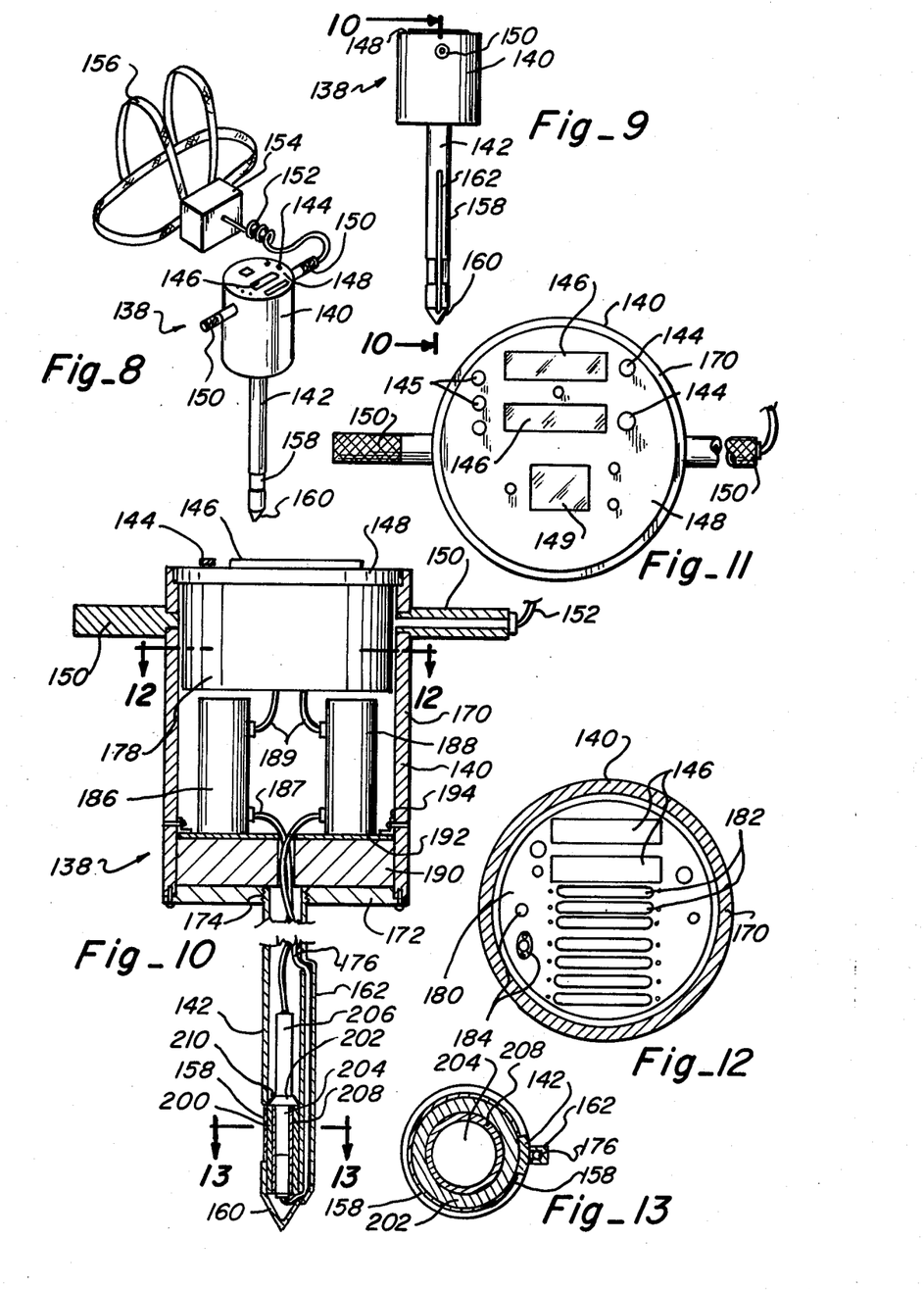
FIG. 8 is a pictoral perspective view of the scintillation radiation detector apparatus according to the present invention arranged in a hand-held probe embodiment.
FIG. 9 is a side elevational view of the hand-held probe shown in FIG. 8.
FIG. 10 is a side elevation sectional view showing the arrangement of the internal components of the detector.
FIG. 11 is a top plan view of a hand-held probe embodiment.
FIG. 12 is a sectional view taken along the lines 12—12 of FIG. 10.
FIG. 13 is a sectional view of the detector material portion of the probe taken along the lines 13—13 of FIG. 10.

As shown in FIG. 10, the body 140 has an outer sheel 170 which can be relatively thick to provide strength and rigidity. This shell can be made from aluminum or any other light-weight material which will provide the necessary strength and ease of portability. The upper plate 148 and lower plate 172 closes the ends of the shell 170 and are mounted to the shell by means of suitable fasteners. The probe 142 is mounted in the center portion of the lower end plate 172 by threads 174 or any other suitable fastening arrangement such as by welding or a bolted flange. The outer sheath of the probe 142 includes the cone section 160 and the window 158. The conduit 162 mounted longitudinally on the outer surface of the probes 142 houses and protects the electrical cable 176 which provides the high voltage power to the photomultiplier tube as well as carrying the output signal from the tube to the visual display. Suitably mounted within the tube 142 is the radiation detector assembly 200. The radiation detector assembly 200 is similar to that described for the other embodiments in that a first or beta radiation scintillation detection material 202 is provided in a cylindrical hollow configuration with a closed end as previously described. Within the hollow cavity of the beta material 202 is mounted the second or gamma radiation scintillation detection material 204. A hollow sleeve of lead can be provided between the two scintillation materials to provide a low energy radiation filter to allow only high energy gamma particles to penetrate the second material. A thin sheet of stainless steel having a thickness of 0.001 inch which acts as a low-energy beta radiation filter, is provided in the exposed areas of the sensing window 158. The detection assembly 200 is suitably mounted within the tube probe 142 with resilient materials which is arranged to absorb shock during handling and use. A photomultiplier tube 206 is optically coupled to the beta scintillation detection material 202 and a second photomultiplier tube 208 is optically coupled to the gamma scintillation material 204.

Again, it is important to maintain the thickness of the beta material 202 within the range of thicknesses of 0.030 to 0.250 inches in order to obtain the desired discrimination without allowing the high energy gamma radiation to scintillate the first material which would cause inaccuracies and extraneous noise in the beta output signal. The upper edge surface of the scintillation material 202 can have a beveled edge 210 to contour the thickness and to lead into the coupling area with the photomultiplier tube 206. The beta sensor tube 206 is connected by cable 187 to a signal conditioning device 186 which in turn is connected by cable 189 to the electronic display device 178. By the same token, the gamma sensor tube 208 is connected by cable 176 to a second signal conditioning device 188 which in turn is connected by a similar cable 189 to the display device 178. The signal conditioning devices 186, 188 are mounted on a plate 192 which is held in place within the body 140 by fasteners 194. A radiation shield 190 of lead or other suitable material can be provided to shield the electronic components from any extraneous radiation.

Within the visual display device 178 are mounted circuit boards 180 upon which components 184 and integrated circuit devices 182 are provided for receiving the output signals from the sensor tubes and conditioning these signals for proper display in the digital display units 146. The electronic circuitry also provides indicator lights 145 mounted on the upper plate 148 of the body 140 to provide visual indication of the mode of operation that is being performed. A third visual display device 149 can also be provided to indicate the differential display or direct reading of percent of uranium ore present. Thus, one digital display 146 is provided to read the output of the first or beta radiation detector with the second display 146 provided to indicate the second or gamma output. Through suitable electronic circuitry, a switch 144 can be provided to instantaneously read the difference between the two visual readouts to indicate directly the percentage fo uranium present in the unknown sample.

In operation, the radiation detector devices, according to the present invention, are both simple and easy to operate. Once the electronic circuitry has been energized and allowed to stablize for a short period of time, the unit is ready for use. Visual displays of the readout of the desired radiation can be calibrated by use of know radiation calibration samples with the display circuitry adjusted accordingly.

It is to be understood that any type of visual display or readout can be provided for use with the dual radiation detector according to the present invention. Thus, it is possible to, instead of having a direct visual digital read-out of the radioactivity present, it is possible to provide a direct input to a computer operation for storage and evaluation of the data. In addition, it is also possible to actually record the output from the detectors for later processing of the data as the user may see fit. In most cases, however, the dual radiation detector is of benefit in providing instantaneous and accurate readout of unknown radioactive samples of the uranium ore type at the location in which it is found.

It is to be understood that with the so called "T" type, portable probe, it is desirable to keep the radiation sensing window 158 as close to the tip end 160 of the probe 142 as is possible. Consequently, the photomultiplier tube 208 can be inserted wholly or partially into the cavity within the beta radiation detector material 202 with a corresponding reduction in the length of the gamma material 204.

It is also to be understood that any type of sensing device which can sense the light energy present in the scintillation material and convert this energy to electrical output signals can be utilized in this invention. It is also possible to rearrange the components within the probe so long as the second scintillation material is positioned concentrically within the first material whereby the radiation striking the second material will have been filtered and segregated from the first radiation.

While an improved dual radiation detector device has been shown and described in detail, it is obvious that this invention is not to be considered to be limited to the exact form disclosed, and that changes in detail and construction may be made in the invention without departing from the spirit thereof.

Having set forth and disclosed the nature of this invention, what is claimed is:

1. A scintillation radiation detector comprising:
   (a) a body means;
   (b) a first scintillation radiation detector material, said material being sensitized to produce light energy whose intensity is directly proportional to the intensity of beta radiation;
   (c) a second scintillation radiation detector material sensitized to produce light energy in direct proportion to the intensity of gamma radiation which has higher energy levels than said beta radiation, said second radiation scintillation detector material being positioned on the opposite side of said first scintillation radiation material from a source of unknown radiation;
   (d) said first scintillation material being configured in a thin cross section whereby the path traveled by said second radiation through said first material is relatively short;
   (e) sensing means positioned adjacent each of said beta and gamma scintillation detector materials on the opposite side of said materials from the source of said unknown radiation whereby the light energy generated by the passage of the radiation through each of the detector materials will be converted from light energy to a separate electrical output signal directly proportional to the intensity of the energy produced by the radiation as it passes through its respective scintillation detector materials, and
   (f) said beta radiation detector material being generally transparent to said gamma radiation so that only light energy is generated by said beta radiation with said gamma radiation only generated light energy within said gamma scintillation material whereby accurate readings of the intensity of said beta and gamma radiation can be determined so that the quantity of uranium ore present in an unknown sample can be determined.

2. An improved scintillation detector apparatus as defined in claim 1 which further includes a rate indicator means which is coupled to the output signals from said beta and gamma detector means.

3. An improved scintillation detector apparatus as defined in claim 2 wherein said rate indicator means includes means for subtracting the readings between the beta and gamma detectors to provide a direct read-out of percentage of uranium ore present in an unknown sample.

4. An improved scintillation detector apparatus as defined in claim 1 wherein the thickness dimension of said beta scintillation detector material is held within the range of 0.250 to 0.030 inch whereby the gamma radiation penetrating through said first detector material will not cause scintillation and false readings in said beta scintillation detector.

5. An improved scintillation detector apparatus as defined in claim 1 wherein said scintillation detector materials are shielded against extraneous radiation on at least three sides.

6. An improved scintillation detector apparatus as defined in claim 1 wherein said beta scintillation detector material is formed in the shape of a flat plate, one side of said flat plate being contiguous with the outer surface of said body means and arranged to be positioned in general contact with the unknown sample material.

7. An improved scintillation detector apparatus as defined in claim 6 wherein the edge of said flat plate on the surface opposite that in contact with the sample is tapered toward the outer edge and toward the surface in contact with said sample whereby the length of the path of the radiation from said unknown sample through the beta detector material is relatively constant regardless of the angle that the radiation penetrates the detector material.

8. An improved scintillation detector apparatus as defined in claim 1 wherein the sensing means is a solid state device which directly converts the light energy created by the scintillation to electrical energy output pulses.

9. A dual scintillation radiation detector apparatus which senses the quantity of two different types of radiation simultaneously in a radioactive sample in order to determine the grade of uranium ore present, said apparatus comprising:
   (a) a body housing means;
   (b) a first scintillation detector material sensitized to a first radiation;
   (c) a second scintillation radiation detector material sensitized to a second higher level radiation;
   (d) said first scintillation detector material being configured in a relatively thin cross section of both of said detector materials being arranged in contiguous position with the second detector material positioned on the opposite side of said first detector material from the source of radiation whereby the highest level energy radiation must pass through said first material to energize said second material, said first and second radiation detector materials being suitably mounted in said body housing;
   (e) sensing means coupled to a surface of each of said scintillation detector materials, said sensing means being capable of receiving the light energy created by the scintillation of the detector materials by the respective radiation whereby the light energy will be converted to electrical output signals proportional to the amount of radiation present within the scintillation detector materials; and
   (f) indicating means arranged to receive the output signals from said sensing means, said indicating means including means for processing the output signals from said sensing means in order to display a differential of said output signals whereby a direct indication of the grade of uranium ore present at a specific location can be obtained.

10. A dual radiation detector apparatus as defined in the claim 9 wherein the first radiation detected by said first detection material is beta and the second radiation detected by said second detection material is gamma radiation.

11. A dual radiation detector apparatus as defined in claim 10 which further includes shielding means provided between the radiation detection material and the sample source of radiation which is sufficient to attenuate low energy radiation from the respective materials so as to selectively limit the output electrical signals to known isotope families of radioactive material.

12. A dual radiation detector apparatus as defined in claim 9 wherein said first scintillation detector material is formed as a generally flat, thin plate.

13. A dual radiation detector apparatus as defined in claim 12 wherein said second radiation detection material is positioned contiguous to the side of said flat plate opposite the source of radiation.

14. A dual radiation detector apparatus as defined in claim 9 wherein the outer surfaces of said first and second detection materials are polished in order to retain and reflect internally the light created by the scintillation of said materials, and the outer surfaces of said detection materials are coated with light impermeable material to aid in the retention of said light energy.

15. A dual radiation detector apparatus as defined in claim 9 wherein a shock aborbing means is positioned between said first and second scintillation detector materials to prevent damage to said materials from the handling and usage of said detector apparatus.

16. A dual radiation detector apparatus as defined in claim 9 wherein said body housing means includes a radiation sample holding means which is slidably mounted within said housing so that the radiation source can be removably positioned adjacent to the surface of said first scintillation detector material.

17. A scintillation radiation detector apparatus as defined in claim 9 wherein said indicating means is mounted within said body housing means.

18. A scintillation detector apparatus as defined in claim 9 wherein said body housing means is arranged in the shape of an elongated cylinder having a longitudinal axis and a diameter which is significantly less than the length of said cylinder, and the ratio of the length of the body housing means to the diameter is greater than 3:1.

19. A scintillation detector apparatus as defined in claim 18 wherein the first and second detector materials are mounted within the body housing means so as to be concentric with the longitudinal axis of said body housing means.

20. A scintillation detector apparatus as defined in claim 9 wherein first radiation shielding means is provided on the outer surface of said first scintillation detector material, and second radiation shielding means is provided between said first and second scintillation detector materials whereby only higher energy levels of the first and second radiation can penetrate into said first and second detector materials respectively.

21. A scintillation detector apparatus as defined in claim 9 wherein the body housing means is arranged in the shape of an elongated cylinder with both scintillation detector materials generally arranged in an intermediate location within said body housing and the area of the body housing adjacent to said first scintillation detection material being reduced in thickness to provide a window means to allow passage of radiation through said body means so that it will penetrate the scintillation materials.

22. A scintillation detector apparatus as defined in claim 21 wherein said body housing means includes means for attaching a thin, flexible support means at one end and the opposite end being rounded whereby the detector can be lowered into an earth bore so that a radiation profile along the length of said bore can be obtained.

23. A scintillation radiation detector as provided in claim 21 wherein said body housing means includes an enlarged section in which the indicating means is mounted, the elongated section and said housing means is fabricated as an integral unit, said enlarged section having handle means provided on opposite sides whereby said detector can be manually supported with the elongated section being pushed into the surface of the earth so that the earth surrounds the window means of the housing whereby the radiation present in the earth surface can be detected.

24. A scintillation detector apparatus as defined in claim 23 wherein the sensing means mounted furtherest from the enlarged section for the indicating means is recessed along with said second scintillation detector material into the cavity of said first scintillation detector material in order to reduce the overall dimension between the window means and the free end of the elongated housing to reduce the required depth of penetration into the earth's surface.

25. A scintillation detection apparatus as defined in claim 21 which includes conduit means arranged along the outer surface of said housing means and parallel to the longitudinal axis of said housing means whereby a connecting cable connecting one of the sensing means with an indicating means is protected and shielded from the radiation sources.

26. A scintillation detector apparatus as defined in claim 9 wherein the individual sensing means are coupled to the respective scintillation detector materials by resin optical coupling means which are positioned between the sensing means and the detector material so that the light energy is transmitted efficiently from the material to the sensing means.

27. A radiation detection apparatus for determining the grade of uranium ore present at a specific location, the apparatus comprising:
   a body housing means,
   a first scintillation detector material sensitized to a first radiation;
   a second scintillation radiation detector material sensitized to a second radiation different from said first;
   said first radiation detector material being formed in the shape of a hollow cylinder having one end closed and the second scintillation detector material being positioned within the hollow cavity of said first radiation detector material and said detector materials being mounted within said body means whereby the first detector material is exposed to a source of radiation through the outer surface of said body housing means whereby the radiation passes through said first material in order to penetrate the second material;
   a pair of suitable sensing means coupled to a surface of each of said scintillation detector materials, said sensing means being capable of receiving the light energy created by the scintillation of the detector materials by the radiation whereby the light energy will be converted to electrical output signals proportional to the amount of radiation present within the respective scintillation detector materials; and
   indicating means arranged to receive the output signals from said sensing means, said indicating means including means for processing the output signals from said sensing means in order to display a differential of said output signals whereby a direct indication of the grade of uranium ore present at a specific location can be obtained.

28. A radiation detection apparatus as defined in claim 27 wherein a single source of battery power for said detection apparatus is mounted within said housing means.

29. A radiation detection apparatus as defined in claim 27 wherein the indicating and sensing means includes an electrical power source which is mounted externally to said housing means with means for electrically connecting the power source to the indicating and sensing means.

30. A radiation detection apparatus as defined in claim 27 wherein said sensing means are photoconductive materials which are arranged adjacent to said scintillation detector materials and are capable of generating electrical output signals proportionally indicative of the light energy present in said scintillation materials whereby the output signals can be introduced to said indicating means for determining the quantity of radiation present.

* * * * *